Patented Nov. 2, 1926.

1,605,071

UNITED STATES PATENT OFFICE.

VICTOR L. RONCI, OF BROOKLYN, NEW YORK, ASSIGNOR, BY MESNE ASSIGNMENTS, TO WESTERN ELECTRIC COMPANY, INCORPORATED, A CORPORATION OF NEW YORK.

METHOD OF ARC WELDING.

No Drawing.   Application filed May 9, 1925.   Serial No. 29,222.

This invention relates to a method of electric arc welding, its object being to weld easily oxidizable metals in the presence of air while excluding all atmospheric oxygen from the area of the weld.

When welding metals, particularly easily oxidizable metals with the electric arc in the presence of air, the arc exerts a destructive effect on the metals due to the oxygen present in the air. This oxygen combines with the arc to change the metallic structure of the welded joint whereby the metal crystallizes on cooling and oxides are formed at the joint. Obviously, this zone of the weld is relatively weak and readily breaks under the slightest pressure. This oxidation of the welded joint may be entirely overcome by conducting the welding operation under conditions which exclude all or at least, a major portion of the atmospheric oxygen.

Heretofore, particularly in the incandescent lamp and vacuum tube arts, the general practice of arc welding oxidizable metal parts, such as tungsten filaments and molybdenum supports, has been to surround the structure to be welded with an atmosphere of hydrogen. This is usually accomplished by means of a "bell" into which the hydrogen gas is fed and the atmospheric oxygen excluded. This method is inconvenient and expensive since the space in the bell is limited and the various operations require the employment of highly skilled operators. Furthermore, only a small percentage of the gas enclosed in the bell surrounds the joint to be welded and the rest is lost in its passage out of the bell.

In accordance with this invention these disadvantages are overcome by surrounding the immediate area of the joint to be welded with a volatile inflammable substance, such as alcohol, which is ignited by the initial arc between the electrodes and establishes a blanketing flame around the joint whereby the atmospheric oxygen is excluded while the weld is being made. This method produces a highly efficient weld between the metal parts and prevents the formation of destructive oxides with the metal which would weaken the welded joint. Furthermore, this method is quick, inexpensive and does not require a highly skilled operator. This method may be performed in a variety of ways but it has been found preferable to coat the surfaces to be welded with a volatile inflammable substance which, in the presence of an electric arc, maintains a reducing atmosphere for a sufficient length of time to exclude all or a large part of atmospheric oxygen from the welded joint. Such substances may consist of alcohol, kerosene, benzine, paraffin or other vaporizable organic substances which will not chemically react with the metals or form compounds which would impair the quality, strength and ductility of the welded joint. It has been found advantageous to use alcohol as a reducing agent during the welding of the joint. Alcohol is most easily applied to the joint when in the form of a solid mixture of alcohol with a less volatile base, such as paraffin, since it can be easily controlled and produces a blanketing flame which burns slowly and steadily whereby a reducing atmosphere is maintained around the joint while the weld is being made.

One method of welding oxidizable metals, such as molybdenum or tungsten, in the presence of air with an electric arc, consists of surrounding the joint to be welded with alcohol. This may be conveniently done by forming a pellet of solidified alcohol and locating the pellet in contact with the joint to be welded. Another way in which the alcohol or other volatile substance may be located within the welding area consists of wrapping a fabric wick, or other porous material, saturated with the volatile inflammable substance, around the metal, directly below the juncture of the two metal parts to be welded. The welding electrodes of any desirable arc welding equipment may be connected to the structure to be welded in the well known manner. The initial arc between the electrodes readily ignites the alcohol or other volatile substance and an enveloping flame surrounds the metal joint and creates a reducing atmosphere whereby practically all atmospheric oxygen is excluded from the vicinity of the joint and the metals may be welded together without the danger of any crystalline formation or oxidation of the grain structure of the metals.

Since the weld can be accomplished in considerably less time than is possible with the "hydrogen bell method" due to the concentrated reducing flame of the volatile substance, it is not necessary to maintain this flame any longer than is necessary to complete the individual welds. However, where a large number of welds are to be made, such as is necessary in an electrode structure of an electron discharge device, it may be advantageous to provide a continuous reducing flame by means of a wick fitted into a vessel containing a supply of alcohol or other volatile inflammable substance. The joints of the electrode structure may then be successively positioned in the reducing flame and the welds performed in the regular manner.

What is claimed is:

1. The method of welding oxidizable metals in the presence of air, which comprises applying a volatile substance to the metallic joint, igniting said substance by the initial arc between the metals to form a reducing flame around said joint, and welding said joint in said flame.

2. The method of welding oxidizable metals in the presence of air with an electric arc, which comprises surrounding the metallic joint with a volatile inflammable substance capable of maintaining a reduced atmosphere around said joint in the presence of said arc, igniting said substance by the initial arc between the metals and welding said joint in said reduced atmosphere.

3. The method of welding oxidizable metals in the presence of air with an electric arc, which comprises surrounding the metal joint with a porous material saturated with a volatile inflammable substance, by the initial arc between the metals, igniting said substance to form a reducing flame around said joint, and arc welding said joint in said reducing flame.

4. The method of welding oxidizable metals in the presence of air with an electric arc, which comprises surrounding the metal joint with a porous material saturated with alcohol, igniting said alcohol by the initial arc between the metals to form a reducing flame around said joint, and arc welding said joint in said reducing flame.

In witness whereof, I hereunto subscribe my name this 8th day of May, A. D. 1925.

VICTOR L. RONCI.